United States Patent
Hoggarth et al.

(10) Patent No.: US 10,643,598 B2
(45) Date of Patent: May 5, 2020

(54) METHOD FOR OPERATING A VEHICLE SOUND SYSTEM

(71) Applicant: FORD GLOBAL TECHNOLOGIES, LLC, Dearborn, MI (US)

(72) Inventors: Marcus Hoggarth, Herts. (GB); David Mingay, Weybridge (GB); Pierre Bernuchon, London (GB); Harriet Dodds, London (GB); Liberty Fearns, Helston (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/135,711

(22) Filed: Sep. 19, 2018

(65) Prior Publication Data

US 2019/0088248 A1 Mar. 21, 2019

(30) Foreign Application Priority Data

Sep. 20, 2017 (GB) .................................. 1715150.7

(51) Int. Cl.
*A61F 11/06* (2006.01)
*G10K 11/178* (2006.01)
(Continued)

(52) U.S. Cl.
CPC .... *G10K 11/17885* (2018.01); *B60R 11/0217* (2013.01); *B60R 11/0247* (2013.01);
(Continued)

(58) Field of Classification Search
CPC ......... G10K 11/17885; G10K 11/1783; G10K 11/17881; G10K 11/17837;
(Continued)

(56) References Cited

U.S. PATENT DOCUMENTS 9,469,247 B2 10/2016 Juneja et al.
2012/0230504 A1 9/2012 Kuroda
(Continued)

FOREIGN PATENT DOCUMENTS

JP  2006023588 A  1/2006
JP  2008184129 A  8/2008
WO 2012145110 A2 10/2012

OTHER PUBLICATIONS

GB Search Report for GB 1715150.7 dated Feb. 27, 2018, 8 pages.

*Primary Examiner* — Ammar T Hamid
(74) *Attorney, Agent, or Firm* — Frank Lollo; Brooks Kushman P.C.

(57) ABSTRACT

A method of operating a vehicle sound system to enhance the driving experience of vehicle occupants. A vehicle-mounted sensor (such as a LIDAR or RADAR system) is used to identify an object in the vehicle environment. A database that may be stored on a remote server is queried, the database containing, in electronic form, a sound stored therein associated with the object. The sound may be a desirable or pleasant sound. The sound is download to the vehicle sound system and the sound system generates the sound in a vehicle cabin for enjoyment by the occupants. Other ambient sounds may be detected by an exterior microphone of the vehicle, characteristics and locations of the sound added to the database. A vehicle noise reduction system may be activated as the vehicle approaches the location when it is determined that the characteristic indicates that the ambient sound is undesirable.

6 Claims, 5 Drawing Sheets

(51) Int. Cl.
  *G06F 16/68*  (2019.01)
  *B60R 11/02*  (2006.01)
  *G06K 9/00*  (2006.01)
  *H04B 1/00*  (2006.01)

(52) U.S. Cl.
  CPC ......... *G06F 16/68* (2019.01); *G06K 9/00791* (2013.01); *G10K 11/1783* (2018.01); *G10K 11/17881* (2018.01); *G10K 11/17837* (2018.01); *G10K 2210/1282* (2013.01)

(58) Field of Classification Search
  CPC ............ G10K 2210/1282; G06F 16/68; B60R 11/0217; B60R 11/0247; G06K 9/00791
  USPC .......................... 381/58, 59, 71.1–71.12, 86
  See application file for complete search history.

(56) References Cited

U.S. PATENT DOCUMENTS

| | | | |
|---|---|---|---|
| 2016/0379621 A1* | 12/2016 | Marti | B60Q 9/00 381/71.4 |
| 2017/0133001 A1 | 5/2017 | Kim | |
| 2017/0199717 A1* | 7/2017 | Pierfelice | G06F 3/165 |
| 2017/0323631 A1* | 11/2017 | Close | G10K 11/17883 |
| 2018/0132052 A1* | 5/2018 | Muench | H04R 1/406 |
| 2019/0052964 A1* | 2/2019 | Ma | H04R 5/033 |

* cited by examiner

METHOD FOR OPERATING A VEHICLE SOUND SYSTEM

CROSS-REFERENCE TO RELATED APPLICATIONS

This application claims foreign priority benefits under 35 U.S.C. § 119(a)-(d) to GB Application 1 715 150.7 filed Sep. 20, 2017, which is hereby incorporated by reference in its entirety.

TECHNICAL FIELD

The present disclosure relates to a method and system for a vehicle sound system and particularly although not exclusively relates to a vehicle sound system comprising a sound prediction system and a noise reduction system.

BACKGROUND

It is desirable to reduce the noise in a cabin of a vehicle, such as a motor vehicle. For example, unwanted noise reduces the comfort of the vehicle's occupants and may even distract a driver of the vehicle. However, some sounds are desirable or enjoyable, and may have a positive effect on the occupants of the vehicle.

SUMMARY

According to an aspect of the present disclosure, there is provided a vehicle sound system for a vehicle (such as a motor vehicle), the vehicle sound system comprising:

a sound prediction system configured to determine a sound characteristic associated with a location on a route of the vehicle;

a noise reduction system configured to reduce noise in a cabin of the vehicle resulting from sounds generated outside the vehicle cabin; and a controller configured to selectively control the noise reduction system to control sound within the vehicle cabin to reduce or transmit sounds associated with the location depending on the sound characteristics determined by the sound prediction system.

The noise reduction system may comprise at least one microphone configured to detect sound outside a cabin of the vehicle. The noise reduction system may comprise at least one speaker configured to emit sound in the cabin of the vehicle, e.g. to at least partially cancel out the sound detected by the microphone. The sound prediction system may determine a sound characteristic associated with the location on the route of the vehicle before a sound linked to the sound characteristic has been emitted or detected by the microphone of the vehicle sound system. The controller may control the noise reduction system so as to reduce or permit the sound linked to the sound characteristic associated with the location being heard by an occupant of the vehicle when at the location.

The sound characteristic may be an indication of the type of sound (e.g. man-made noises, such as construction, engine or traffic noise etc., or naturally-occuriring sounds, such as birdsong, wind in trees, river flowing etc.); an indication of whether the sound is desirable or undesirable; a sound level (e.g. volume); a sound waveform or any other sound characteristic. As used in the present context, "desirable" is intended to mean pleasant or enjoyable to vehicle occupants.

The sound prediction system may determine whether the sound characteristic associated with the location corresponds to an undesirable noise. The controller may control the noise reduction system (e.g. the at least one speaker) so as to reduce the undesirable noise.

The sound prediction system may determine whether the sound associated with the location corresponds to a desirable sound. The controller may control the noise reduction system (e.g. the at least one speaker) so as to permit transmission of the desirable sound. The desirable sound may originate from outside the vehicle cabin. The controller may control the noise reduction system (e.g. the at least one speaker) so as not to reduce the desirable sound. Alternatively, the desirable sound may be artificially generated or augmented in the vehicle cabin by a speaker, e.g. by the at least one speaker of the noise reduction system.

The sound prediction system may predict a future position of the vehicle, e.g. based on a route determined by satellite navigation system and/or the current vehicle trajectory and road layout. The sound prediction system may predict sounds at future positions of the vehicle.

The sound prediction system may obtain a route of the vehicle, e.g. which may be determined by a satellite navigation system. The sound prediction system may determine from the route, one or more locations through which the vehicle is predicted to pass. The sound prediction system may query a database linking a plurality of locations with one or more associated sound characteristics for each location. The sound prediction system may be configured to query the database, which may be stored on a remote server (e.g. a computing cloud) and may be accessible by other vehicles. The sound prediction system may be configured to update the database with sounds detected by the vehicle as it passes through one or more locations. The vehicle sound system and/or remote server may determine the sound characteristics from the detected sound.

The noise reduction system may be configured to at least partially cancel out sounds of a particular type or origin. The noise reduction system may simultaneously permit the transmission of other sounds into the vehicle cabin. The noise reduction system may be selectively activatable.

The vehicle sound system may be configured to activate the noise reduction system when the noise prediction system predicts sound levels exceeding a threshold level and/or certain predetermined sound types. The noise reduction system may be configured to reduce, e.g. block, certain types of noise.

The vehicle sound system may be configured to activate the noise reduction system when it is determined that the sound characteristic indicates that the sounds associated with a location are undesirable, e.g. as the vehicle approaches the location. The vehicle sound system may be configured to deactivate the noise reduction system when it is determined that the sound characteristic indicates that the sounds associated with a location are desirable, e.g. as the vehicle approaches the location.

The noise reduction system may be manually activatable by an occupant of the vehicle. The sound prediction system may be configured to upload to the remote server data about the manual activation or deactivation of the noise reduction system and the associated locations. The remote server may infer from such data whether the sounds associated with the locations are desirable or undesirable.

The vehicle sound system may further comprise a directional microphone (such as an interference tube microphone) configured to detect sounds ahead of the vehicle and which are not yet audible by the microphone. An interference tube microphone may comprise a microphone coupled to a tube with a series of circumferential slots. The slots may produce interference patterns in sound waves from the sides, which causes at least partial cancellation of sounds from the sides and increases the detectability of sounds from directly in front of the tube.

The vehicle sound system may further comprise at least one sensor configured to identify objects around the vehicle. The sensor may comprise a camera, a Light Detection and Ranging (LIDAR) sensor, a Radio Detection and Ranging (RADAR) sensor or any other type of sensor. The at least one sensor may be used in a hazard awareness system to identify hazards, e.g. for an autonomous or semi-autonomous driving system. The sensor (e.g. together with an associated controller) may identify a type of object from a predetermined list of objects, e.g. other vehicle, construction digger, tree etc. The vehicle sound system may be configured to associate sound characteristics with the objects identified around the vehicle. There may be a predetermined database of objects and associated sound characteristics. The vehicle sound system may use the sensor to determine the type of object and then consult the database to determine the sound's characteristics. For example, if the vehicle sound system identifies a tree, the database may link nature sounds (such as birdsong, wind in trees etc.) with the tree. Likewise, if construction machinery is identified, the database may link construction noise with the machinery.

Having determined a characteristic of the sound, the vehicle sound system may allow transmission of the sound into the vehicle cabin if it is deemed to be desirable (e.g. when the sound is within audible range of the vehicle). The desirable sound may be transmitted by not cancelling the desirable sound out or by artificially recreating the desirable sound in the vehicle cabin (the recreated sound may be a reproduction of the sound outside or a similar sound, e.g. from a library of sounds). By contrast, the vehicle sound system may not allow transmission of the sound into the vehicle cabin if it is deemed to be undesirable. If both desirable and undesirable sounds are identified, the vehicle sound system may permit transmission of only the desirable sounds, e.g. via selectively cancelling out the undesirable sounds. Alternatively, both the desirable and undesirable sounds may be cancelled out and the desirable sounds (or equivalent sounds) may be artificially generated in the vehicle cabin.

The vehicle sound system may comprise a mode setting in which substantially all sounds from outside the vehicle cabin are at least partially cancelled. The vehicle sound system may comprise a mode setting in which substantially all sounds from outside the vehicle cabin are at least partially cancelled unless it is determined that external sounds associated with a location are desirable, in which case such sounds may be permitted in the vehicle cabin (e.g. by not blocking or artificially creating with speaker or enhancing with speaker).

The vehicle sound system may comprise a mode setting in which substantially all sounds from outside the vehicle cabin are permitted. The vehicle sound system may comprise a mode setting in which substantially all sounds from outside the vehicle cabin are permitted unless it is determined that external sounds associated with a location are undesirable, in which case such sounds may be at least partially cancelled.

A vehicle may comprise the above-mentioned vehicle sound system.

According to a further aspect of the present disclosure, there is provided a remote server configured to communicate with a plurality of vehicles, the remote server having a database linking a plurality of locations or objects with one or more associated sound characteristics for each location or object.

The remote server may be configured to receive location data and associated sounds detected by one or more of the vehicles. The remote server may be configured to analyze the detected sounds and determine characteristics of the sound.

According to a further aspect of the present disclosure, there is provided a method for a vehicle sound system for a vehicle, the vehicle sound system comprising:

a sound prediction system configured to determine a sound characteristic associated with a location on a route of the vehicle; and a noise reduction system configured to reduce noise in a cabin of the vehicle resulting from sounds generated outside the vehicle cabin;

wherein the method comprises:

determining with the sound prediction system the sound characteristic associated with the location on the route of the vehicle; and selectively controlling the noise reduction system to control sound within the vehicle cabin to reduce or transmit sounds associated with the location depending on the sound characteristics determined by the sound prediction system.

Features described in respect of the aforementioned aspect of the present disclosure may equally apply to the present aspect.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
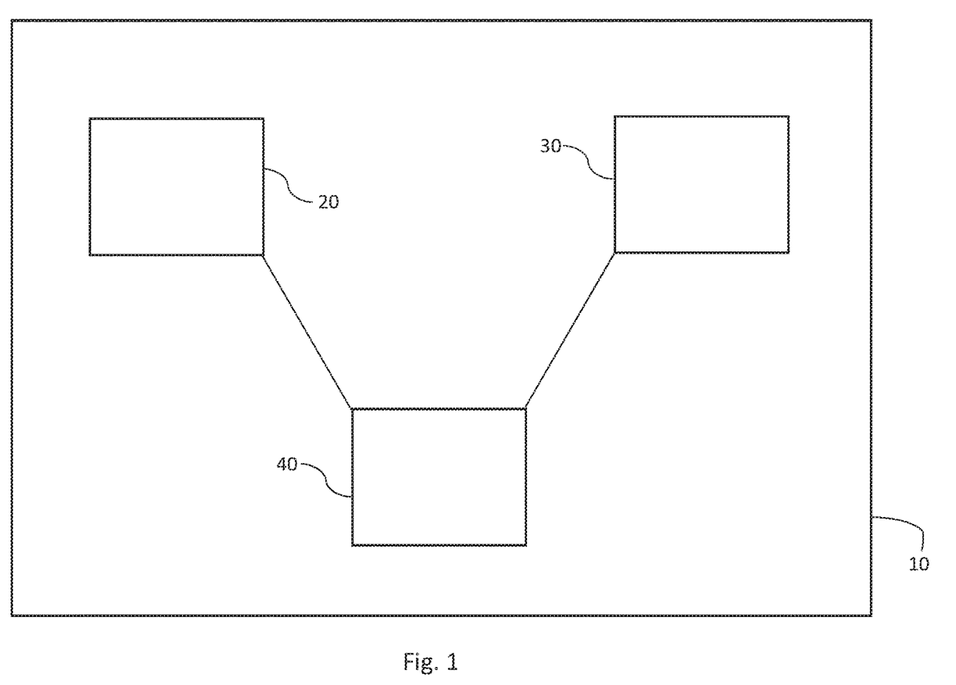
FIG. 1 is a block diagram depicting a vehicle sound system according to arrangements of the present disclosure.

With reference to FIG. 1, the present disclosure relates to a vehicle sound system 10 for a vehicle, such as a motor vehicle. The vehicle sound system 10 comprises a sound prediction system 20, a noise reduction (e.g. cancelling) system 30 and a controller 40, which is operatively coupled to the sound prediction system 20 and noise reduction system 30. The sound prediction system 20 determines a sound characteristic associated with a location on a route of the vehicle. The noise reduction system 30 is configured to reduce noise in a cabin of the vehicle resulting from sounds generated outside the vehicle cabin, e.g. by emitting soundwaves to at least partially cancel the noise in the cabin. The controller 40 selectively controls the noise reduction system 30 to control sound within the vehicle cabin to alternatively reduce or transmit sounds associated with the location on the route of the vehicle. The controller 40 may control the noise reduction system depending on the sound characteristic determined by the sound prediction system 20.

The sound characteristic may be an indication of the type of sound, e.g. whether the sound is man-made or natural. Examples of man-made noises include sounds from construction machinery, other vehicles and their engines, or any other artificial noise. Examples of natural sounds include animal noises, such as from birds or insects, the sound of trees caused by wind, the sound of flowing water or any other natural sounds. The sound characteristic may indicate whether the sound is desirable or undesirable. For example, it may be considered that man-made noises are undesirable and that natural sounds are desirable. The sound characteristic may also or otherwise comprise a sound level, e.g. volume, a sound signature, a sound waveform, a Fourier transform of a sound waveform or any other characteristic of the sound.

The sound prediction system 20 may determine whether the sound characteristic associated with the location on the vehicle route corresponds to an undesirable sound. A sound associated with the sound characteristic may not be substantially detectable by the noise reduction system 30 when the sound prediction system 20 determines the sound characteristic associated with the location. The controller 40 may control the noise reduction system 30 so as to reduce the undesirable sound that may be heard within the vehicle cabin. Conversely, the sound prediction system 20 may determine whether the sound associated with the location on the vehicle route corresponds to a desirable sound. The controller 40 may control the noise reduction system 30 so as to permit transmission of the desirable sound in the vehicle cabin. For example, the desirable sound may originate from outside the vehicle cabin and the controller 40 may control the noise reduction system 30 so as not to reduce the desirable sound. Alternatively, the desirable sound may be artificially generated or augmented in the vehicle cabin by a speaker of the noise reduction system 30.

If both desirable and undesirable sounds are identified by the sound prediction system 20, the vehicle sound system 10 may permit transmission of only the desirable sounds in the vehicle cabin. For example, the controller 40 may control the noise reduction system 30 so as to selectively cancel out only the undesirable sounds and allow the desirable sounds to be transmitted into the vehicle cabin. Alternatively, both the desirable and undesirable sounds may be cancelled out by the noise reduction system 30 and the desirable sounds (or equivalent sounds) may be artificially generated by a speaker of the noise reduction system 30.

The vehicle sound system 10 may operate in a number of modes, which an occupant of the vehicle may select. For example, in a first mode the vehicle sound system 10 may cancel out substantially all sounds from outside the vehicle cabin so that such sounds are reduced or inaudible within the vehicle cabin. In a second mode, the vehicle sound system 10 may cancel out substantially all sounds from outside the vehicle unless it is determined that certain external sounds associated with a location are desirable, in which case such desirable sounds may be permitted in the vehicle cabin. As mentioned above, the desirable sounds may be allowed to transmit in the vehicle cabin from the outside or they may be artificially created or enhanced by a speaker of the noise reduction system 30. In a third mode, the vehicle sound system 10 may permit substantially all sounds from outside the vehicle to be transmitted into the vehicle cabin. In a fourth mode, the vehicle sound system 10 may permit substantially all sounds from outside the vehicle transmitting into the vehicle cabin, unless it is determined that external sounds associated with a location are undesirable, in which case such undesirable sounds may be at least partially cancelled by the noise reduction system 30.

Figure 2:
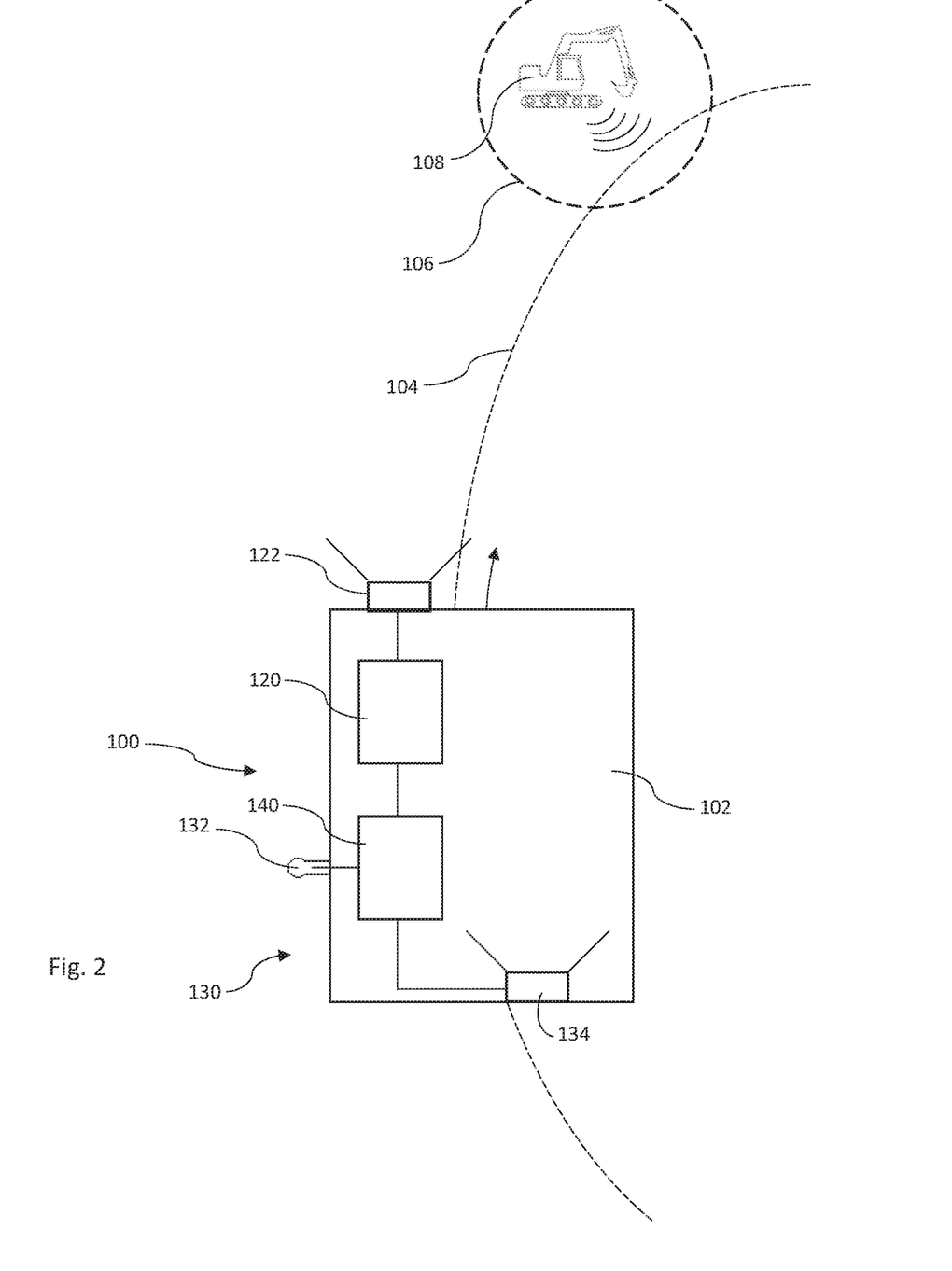
FIG. 2 is a schematic diagram depicting a vehicle sound system according to a first particular arrangement of the present disclosure.

With reference to FIG. 2, a vehicle sound system 100 for a vehicle 102 according to a first particular arrangement of the present disclosure comprises a sound prediction system 120, a noise reduction system 130 and a controller 140 operatively coupled to the sound prediction system 120 and the noise reduction system 130.

The noise reduction system 130 may comprise at least one microphone 132, which is configured to detect sound originating from outside the vehicle cabin (e.g. outside the vehicle or from within an engine bay or exhaust of the vehicle). The noise reduction system 130 may further comprise at least one speaker 134, which is configured to emit sound in the vehicle cabin. The controller 140 may also, at least in part, form part of the noise reduction system 130. Alternatively, a separate controller may be provided as part of the noise reduction system 130. In either case, the controller may control the at least one speaker 134 to produce soundwaves that interfere with the soundwaves from the sound originating from outside the vehicle cabin so as to at least partially cancel the sound originating from outside the vehicle cabin. The noise reduction system 130 may be selectively activatable, e.g. an occupant of the vehicle may select to activate the noise reduction system via a user setting.

The sound prediction system 120 may determine a sound characteristic associated with a location 106 on a route 104 of the vehicle 102 before a sound linked to the sound characteristic has been emitted or detected by the microphone 132. The controller 140 may then control the noise reduction system 130, so as to reduce or permit the sound linked to the sound characteristic associated with the location being heard by an occupant of the vehicle when the vehicle is at or in audible range of the location.

In the particular arrangement shown in FIG. 2, the sound prediction system 120 may comprise a directional microphone 122, which is configured to detect sounds from objects 108 at locations 106 ahead of the vehicle 102. Said sounds may not necessarily be detectable by the microphone 132 at the time of detection by the microphone 122. The directional microphone 122 may be configured to increase the amplitude of sounds originating from a location further from the vehicle than the amplitude of sounds originating from closer to the vehicle. The directional microphone 122 may be configured to detect sounds originating from a location that is in a certain direction or range of directions relative to the vehicle. For example, the directional microphone 122 may comprise a guide that reduces sounds from closer to the vehicle reaching a sensor of the microphone and that channels sounds originating from a location further from the vehicle. In this way, the directional microphone 122 may detect sounds originating from locations at a distance from the vehicle that the microphone 132 would not be able to detect to the same extent.

By way of example, the directional microphone 122 may consist of an interference tube microphone, which may comprise a tube coupled to a sensor of the microphone. The tube may comprise a series of circumferential slots, which may produce interference patterns in soundwaves originating from the sides of the tube and the interference patterns may cause at least partial cancellation of the sounds from the side, thereby increasing the detectability of sounds entering the end of the tube.

The directional microphone 122 may be positioned so as to detect sounds originating from locations in front of the vehicle. The direction of the directional microphone 122 may change, e.g. by virtue of an actuator, so that a range of locations can be scanned for sounds originating from said locations. The direction of the directional microphone 122 may change according to a predicted path 104 of the vehicle. For example, if it is predicted that the vehicle will traverse round a bend, the directional microphone 122 may be directed to point towards locations on or past the bend. The directional microphone may otherwise scan through a range of directions. Alternatively, a plurality of directional microphones may be provided to obtain sound from a range of locations.

The sound prediction system 120 may determine a sound characteristic of the detected sound. The sound characteristic may be one of those mentioned above. The vehicle sound system 100 may activate the noise reduction system 130 if it is determined that the sound characteristic indicates that the sounds associated with the location are undesirable and the noise reduction system has not already been activated. The noise reduction system may thus be activated before the vehicle reaches the location and before the sounds originating from the location are audible to occupants of the vehicle. By contrast, the vehicle sound system 100 may at least partially deactivate the noise reduction system 130 if it is determined that the sound characteristic indicates that the sounds associated with the location are desirable. In this way, the noise reduction system may be deactivated before the vehicle reaches the location from which the desirable sounds originate.

Figure 3:
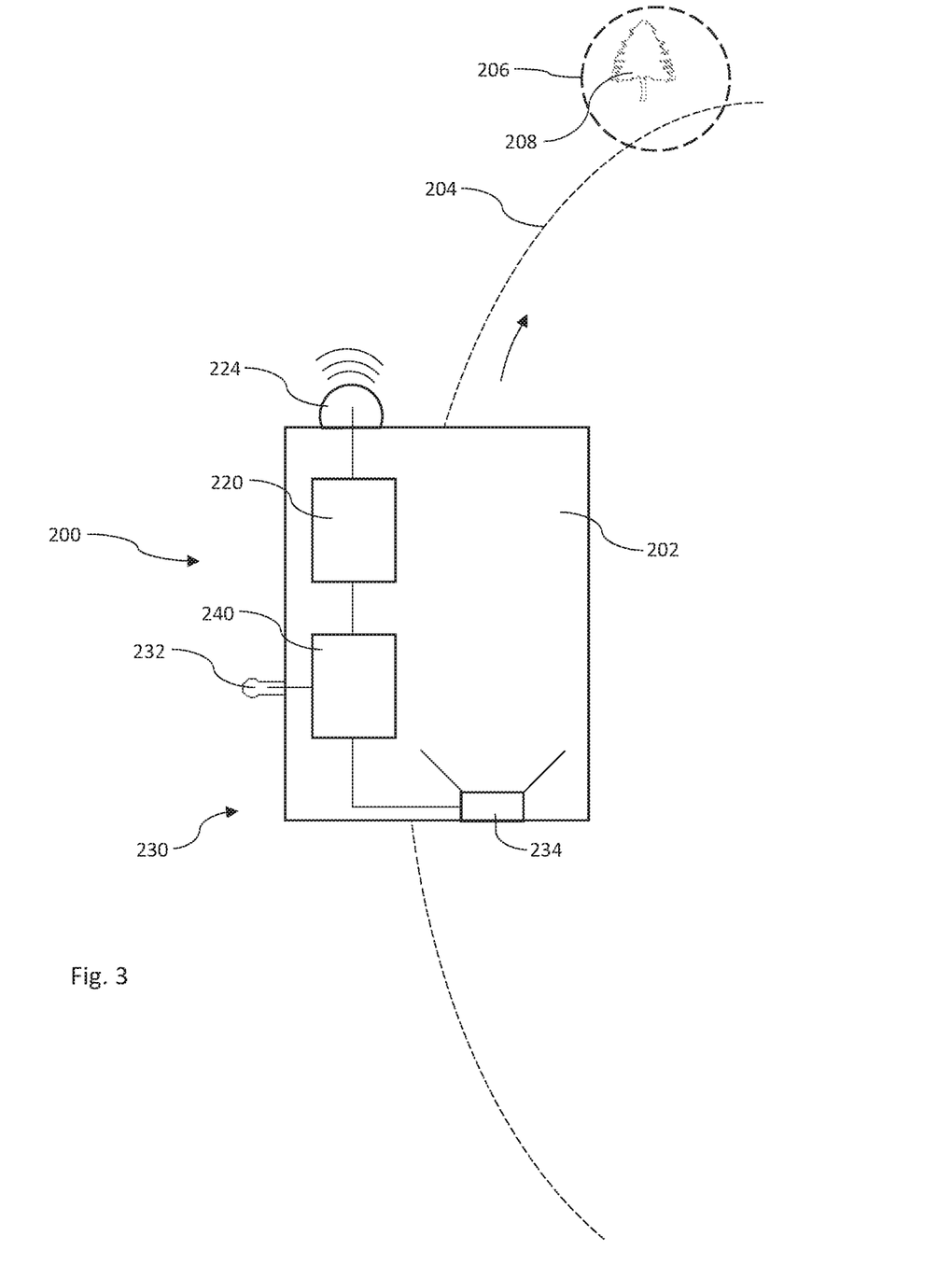
FIG. 3 is a schematic diagram depicting a vehicle sound system according to a second particular arrangement of the present disclosure.

Referring now to FIG. 3, a vehicle sound system 200 according to a second particular arrangement of the present disclosure may comprise at least one sensor 224 configured to identify objects 208 at locations 206 around the vehicle 202. By way of example, the sensor 224 may comprise a camera, a Light Detection and Ranging (LIDAR) sensor, a Radio Detection and Ranging (RADAR) sensor or any other type of sensor capable of sensing objects around the vehicle. The vehicle sound system 200 may further comprise the sound prediction system 220, controller 240 and the noise reduction system 230. The noise reduction system 230 may comprise the microphone 232 and the speaker 234. Accordingly, the vehicle sound system 200 is similar to the vehicle sound system 100 and features described above in respect of the vehicle sound system 100 may equally apply to the vehicle sound system 200. For example, the vehicle sound system 200 may in addition to the sensor 224 comprise the directional microphone 122 of the vehicle sound system 100.

The sensor 224 may be used in a hazard awareness system of the vehicle 202. For example, a hazard awareness system may identify hazards for an autonomous or semi-autonomous driving system of the vehicle 202.

The sensor 224 may be configured to determine, at least approximately, the shape of objects around the vehicle 202. A controller associated with the sensor 224 may identify the type of object from the shape data obtained from the sensor 224. For example, the sensor and associated controller may be able to identify objects, such as other vehicles, construction machinery, trees etc.

The vehicle sound system 200 may associate sound characteristics with the types of objects identified by the sensor 224 and its associated controller. The controller 240 may refer to a predetermined database of object types and associated sound characteristics. For example, if the sensor 224 and its associated controller identify a naturally-occurring object such as a tree, the database may link nature sounds (such as birdsong, wind in trees etc.) with the tree. Similarly, if construction machinery is identified by the sensor 224 and its associated controller, the database may link construction noise with the construction machinery.

Having determined a characteristic of the sound, the vehicle sound system 200 may then decide if the associated sound is desirable or undesirable. As mentioned above, if the sound is deemed desirable, the noise reducing system 230 may permit transmission of, artificially reproduce or enhance the desirable sound. By contrast, if it is determined that the sound is undesirable, the noise reduction system 230 may prevent or reduce transmission of the sound into the vehicle cabin.

The sensor 224 may detect objects 208 on or around a future path 204 of the vehicle and which the sounds from such objects may not yet be audible to occupants of the vehicle. In this way, the vehicle sound system 200 may prevent or reduce unwanted sounds in the vehicle cabin before they become audible to the occupants.

Figure 4:
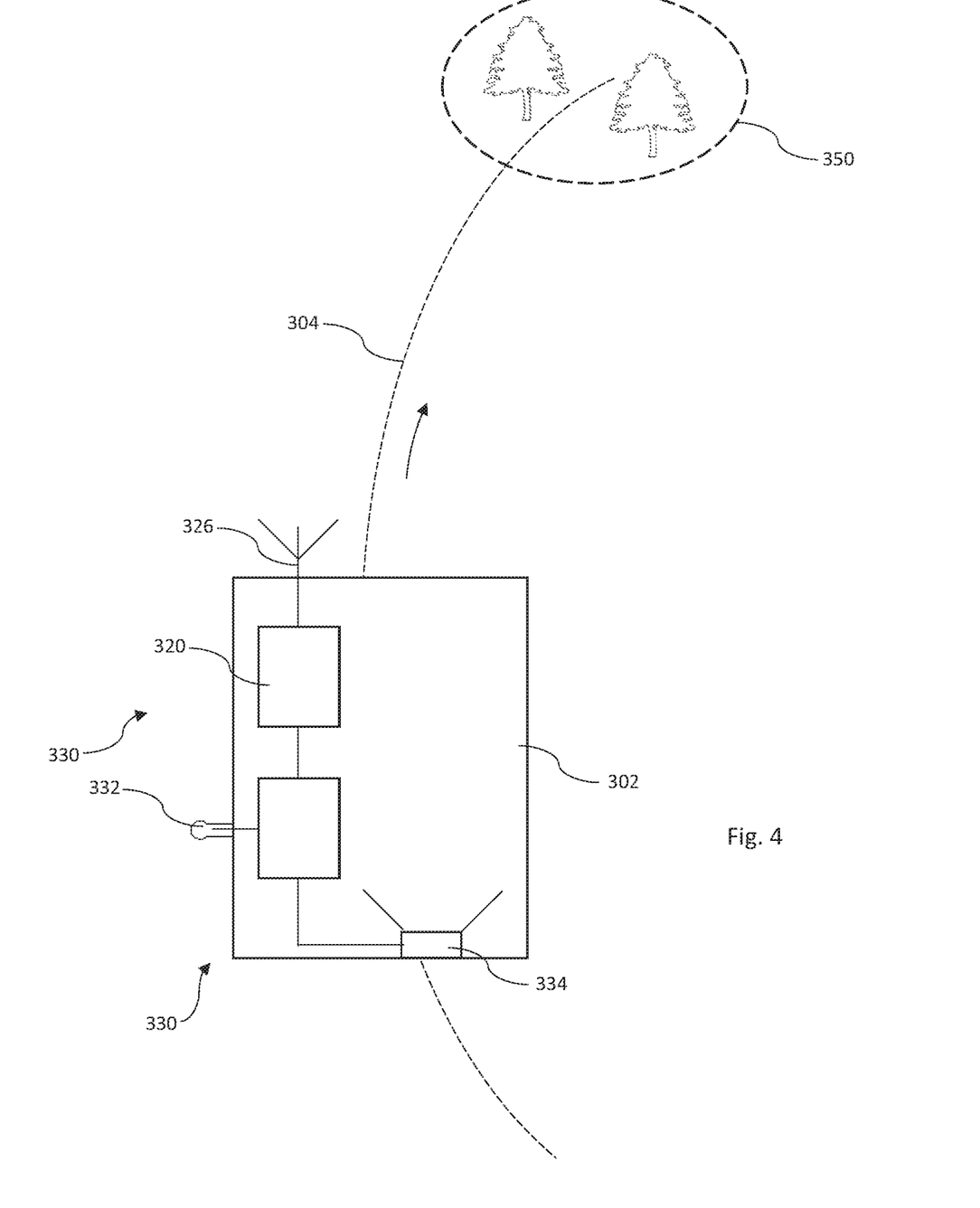
FIG. 4 is a schematic diagram depicting a vehicle sound system according to a third particular arrangement of the present disclosure.

Referring now to FIG. 4, a vehicle sound system 300 according to a third particular arrangement of the present disclosure comprises a navigation system 326 configured to determine the position of the vehicle 302. The navigation system 326 may be a satellite navigation system or any other navigation system that is capable of determining the location of the vehicle 302. In addition, the vehicle sound system 300 comprises the sound prediction system 320, the controller 340 and the noise reduction system 330 described above. In particular, the noise reduction system 330 may comprise the microphone 332 and speaker 334. Features described in respect of the first and second particular arrangements may apply equally to the vehicle sound system 300 according to the third particular arrangement.

The navigation system 326 may determine a route 304 for the vehicle 302, e.g. based on a destination selected by an occupant of the vehicle. The sound prediction system 320 may determine from the route one or more locations 350 through which the vehicle is predicted to pass. Having determined locations 350 through which the vehicle is predicted to pass, the sound prediction system 320 may query a database that links locations with one or more associated sound characteristics for each location. The database may be stored on a remote server, e.g. a computing cloud, and may be accessible by other vehicles.

Having determined the sound characteristics for the location 350 through which the vehicle 302 may pass, the vehicle sound system 300 may activate the noise reduction system 330 if it is determined that the sounds likely to be encountered at the location 350 are undesirable. Similarly, if it is determined that the sounds likely to be encountered at the location 350 are desirable, then the noise reduction system 330 may be at least partially deactivated. Alternatively, if the sounds are determined to be desirable at location 350 the noise reduction system 330 may remain activated and sounds corresponding to those likely to be encountered at the location 350 may be artificially generated in the vehicle cabin.

As mentioned above, the sound prediction system 300 may predict a future position of the vehicle 302 based on a route determined by the navigation system 326, e.g. a satellite navigation system. Additionally or alternatively, the vehicle sound system 300 may use the current vehicle trajectory and road layout to predict future position of the vehicle 302. In either case, the sound prediction system 320 may predict sounds at future positions of the vehicle 302 and the vehicle sound system 300 may control the noise reduction system 330 depending on the prodicted sound characteristics.

Figure 5:
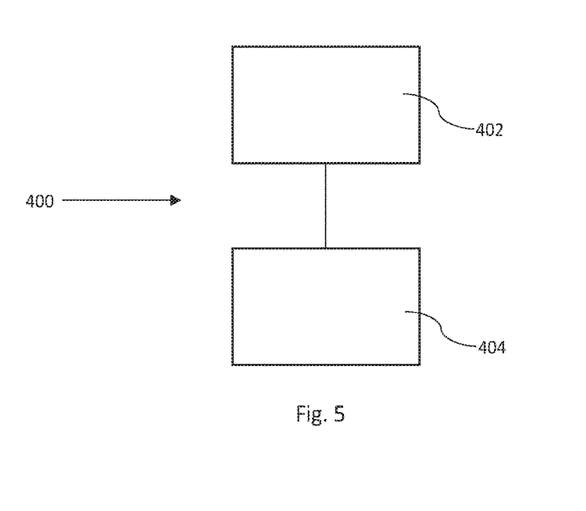
FIG. 5 is a block diagram depicting a method for a vehicle sound system according to arrangements of the present disclosure.

With reference to FIG. 5, the present disclosure relates to a method 400 for the vehicle sound systems 10, 100, 200, 300. In a first step 402, the method 400 comprises determining with the sound prediction system 120, 220, 320, 20 the sound characteristic associated with the location on the route of the vehicle. In the second step 404, the method 400 comprises selectively controlling the noise reduction system 30, 130, 230, 330 to control sound within the vehicle cabin to reduce or transmit sounds associated with the location and depending on the sound characteristic(s) determined by the sound prediction system in the first step 402.

Figure 6:
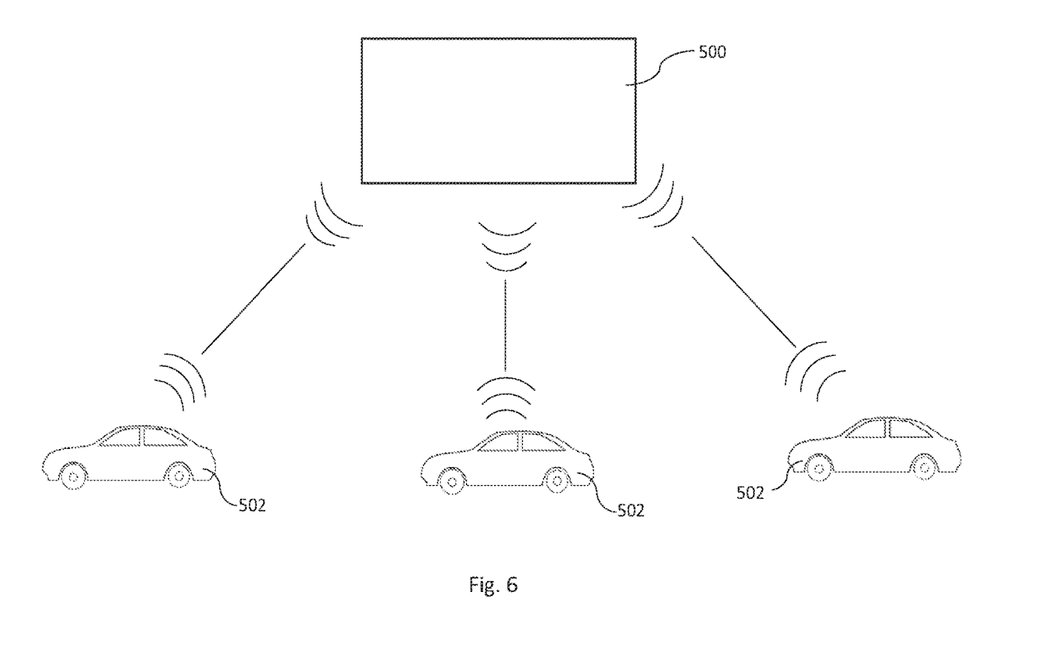
FIG. 6 is a schematic diagram depicting a remote server configured to communicate with a plurality of vehicles according to arrangements of the present disclosure.

Referring now to FIG. 6, a remote server 500 may communicate with a plurality of vehicles 502. The remote server 500 may be provided on a computing cloud or any other computing network which is accessible by the vehicles 502. The vehicles 502 may communicate with the remote server 500 wirelessly, such as through a mobile telecommunications network. The remote server 500 may also be provided within infrastructure associated with a road network and the vehicles 502 may communicate with such infrastructure. The remote server 500 may have a database that links a plurality of locations with one or more associated sound characteristic for each location. For example, the database may link a particular location with certain sound characteristics. By way of example, a database may link the location of a park to naturally-occurring and desirable sounds, such as birdsong or the wind in the trees. The locations may correspond to a particular point, e.g. as defined by a coordinate system, or an area with a defined boundary. For example, the locations may correspond to geo-fenced areas.

The vehicles 502 may communicate with the remote server 500 providing details of the locations that the vehicle is predicted to travel through. The remote server 500 may in return provide the vehicle with sound characteristics associated with the particular locations. The vehicle sound systems on-board the vehicle 502 may then determine how to control the on-board noise reduction system based on the sound characteristics obtained from the remote server 500.

The remote server 500 may also receive location data and associated sounds detected by the vehicles 502. For example, microphones 132, 232, 332 may detect sounds as the vehicles 502 pass through a particular location. The detected sounds or characteristics associated with the sounds may be uploaded to the remote server together with the locations at which the sounds are detected. The remote server 500 may analyze the detected sounds and determine the associated characteristics of the sound or the on-board vehicle sound systems may perform this analysis. In this way, the database for the remote server that links locations and sound characteristics may be curated and kept up to date.

The remote server 500 may additionally or alternatively have stored thereon or access a database that links objects or object types with particular sound characteristics. Such a database may be queried by the controller 240 of the vehicle sound system 200 according to the second particular arrangement of the present disclosure.

In an alternative arrangement, a particular vehicle may communicate with another vehicle in a vehicle to vehicle communication network. A first vehicle may detect sounds at the location of the first vehicle and a second vehicle may communicate with the first vehicle to obtain characteristics of the sound at that location before that sound is audible to the second vehicle.

The remote server 500 may also receive data from the vehicles 502 relating to the manual activation or deactivation of the noise reduction system 30, 130, 230, 330. For example, if an occupant of the vehicle manually activates the noise reduction system it may be inferred that the sounds at that location are undesirable. Conversely, if an occupant of the vehicle manually deactivates the noise reduction system, it may be inferred that the sounds at that location are desirable. The remote server 500 may store such data in the database as a sound characteristic linked to that location.

It will be appreciated by those skilled in the art that although the invention has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a sound system of a vehicle, the sound system comprising:
   a noise reduction system having at least one microphone and at least one speaker located in a cabin of the vehicle and configured to reduce noise in the cabin resulting from sounds generated outside the cabin by emitting sound from the speaker to at least partially cancel out the sound detected by the microphone, the noise reduction system being manually activatble and deactivatable by an occupant of the vehicle; and
   a sound prediction system configured to determine a sound characteristic associated with a location on a route of the vehicle;
   wherein the method comprises:
   querying a database linking a plurality of locations with one or more associated sound characteristics for each location, wherein the database is stored on a remote server and is accessible by at least one other vehicle;

operating the sound prediction system to determine the sound characteristic associated with the location on the route;

selectively controlling the noise reduction system to control sound within the cabin to reduce or transmit sounds associated with the location depending on the sound characteristics determined by the sound prediction system; and uploading to the remote server data related to the manual activation and/or deactivation of the noise reduction system and the associated locations, wherein the remote server infers from such data whether the sounds associated with the locations are desirable or undesirable.

2. The method of claim 1, further comprising:

operating a vehicle-mounted sensor to identify an object;

operating the sound prediction system to access the database and identify a sound stored therein associated with the object; and operating a vehicle sound system to generate the sound in a vehicle cabin.

3. The method of claim 1, further comprising:

operating an exterior microphone of the vehicle to detect an exterior sound;

linking a characteristic of the second sound with a location where the exterior sound was detected; and adding the location and the characteristic to the database.

4. The method of claim 3, further comprising:

operating the sound prediction system to analyze the exterior sound and determine a characteristic thereof; and activating the noise reduction system of the vehicle when it is determined that the characteristic indicates that the exterior sound is undesirable as the vehicle approaches the location.

5. The method of claim 2, wherein the object is a naturally-occurring object and the sound is desirable.

6. A sound system for a vehicle, comprising:

a noise reduction system manually activatable and/or deactivatable by an occupant of the vehicle to reduce noise in a cabin of the vehicle resulting from sounds generated outside the cabin, the noise reduction system configured to emit sound from at least one microphone to at least partially cancel out the sound detected by at least one microphone located in the cabin; and a sound prediction system configured to determine a sound characteristic associated with a location on a route of the vehicle;

a controller configured to selectively control the noise reduction to control sound within the cabin to alternatively reduce or transmit sounds associated with the location depending on the sound characteristic determined by the sound prediction system, wherein the sound prediction system wirelessly queries a database stored on a remote server, the database linking a plurality of locations with one or more associated sound characteristics for each location of the plurality, the remote server being wirelessly accessible by at least one other vehicle, and wherein the noise reduction system is configured to upload to the remote server data related to the manual activation and/or deactivation of the noise reduction system and the associated locations, wherein the remote server infers from such data whether the sounds associated with the locations are desirable or undesirable.

* * * * *